Dec. 24, 1940. R. A. WHITTINGHAM 2,226,457
VEHICLE BRAKE
Filed Nov. 15, 1938 3 Sheets-Sheet 1
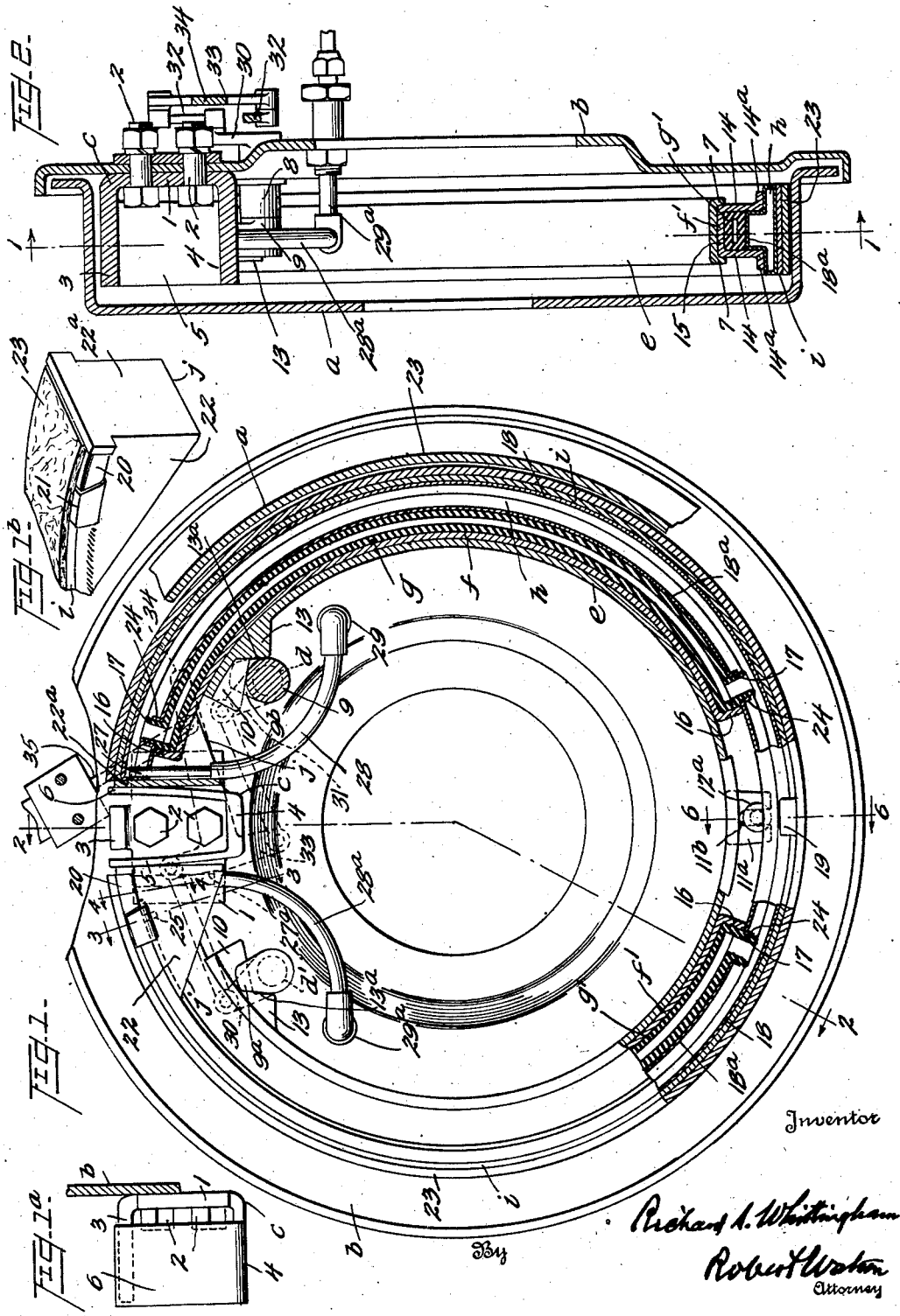

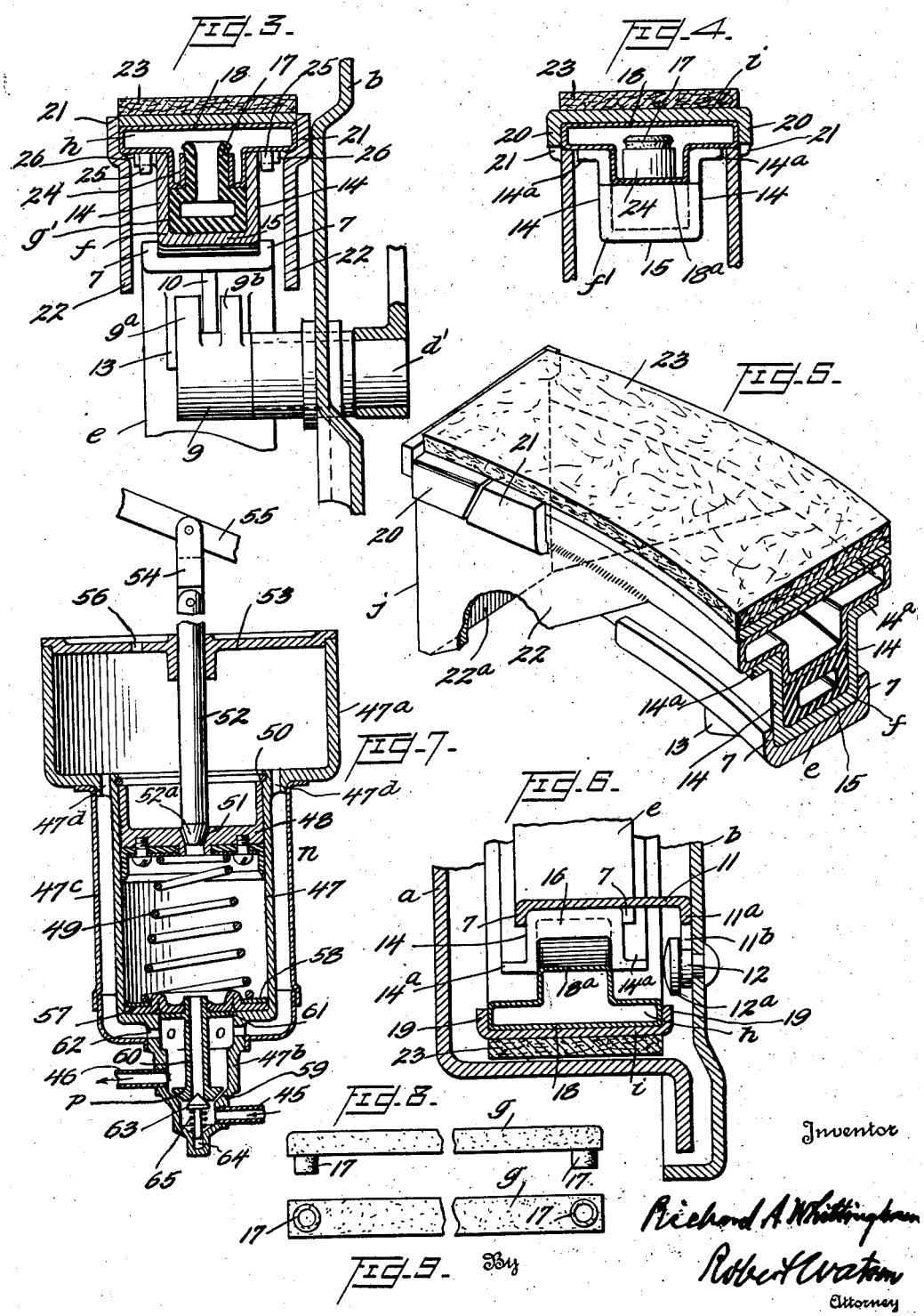

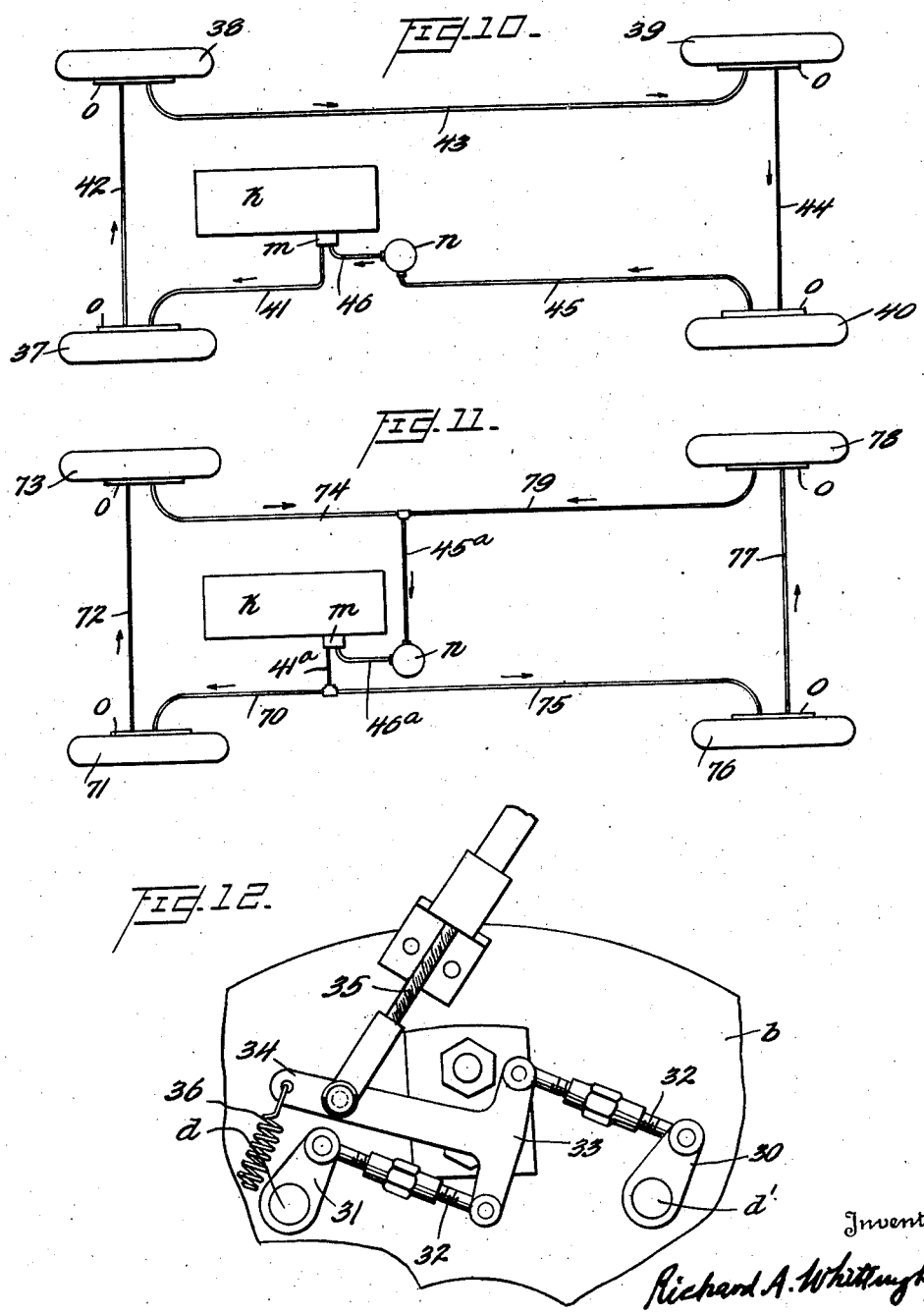

Patented Dec. 24, 1940

2,226,457

UNITED STATES PATENT OFFICE 2,226,457

VEHICLE BRAKE

Richard A. Whittingham, Perryville, Md.

Application November 15, 1938, Serial No. 240,559

10 Claims. (Cl. 188—152)

This invention relates to hydraulic brakes for motor-operated vehicles. In my Patent Number 2,098,409, dated November 29, 1937, I have shown a brake comprising a hollow brake shoe, which extends almost completely around the interior of the brake drum, with means for expanding the shoe into engagement with the brake drum when liquid is forced into the shoe from a pedal-operated master cylinder. When expanded into engagement with the rotating brake drum, the brake lining makes complete and uniform contact with the drum throughout the length of the shoe. The shoe is movable endwise by the friction of the drum, to a limited extent, and bears against a stop at a radial distance from the axis of the shoe which shortens with increased end thrust of the shoe and lengthens with decreased end thrust of the shoe, whereby the degree of self-energization or braking power derived from the movement of the vehicle may be made proportionate to the pedal pressure which is used to force the shoe into engagement with drum, only a moderate pedal pressure being required.

In the invention of the present application, the hollow brake shoe having a limited circumferential movement is used, and the endwise thrust of the shoe is applied to a stop at a radial distance from the axis of the drum which shortens with increased end thrust of the shoe and lengthens with decreased end thrust of the shoe. Hollow expansible members, preferably of synthetic rubber, are associated with the shoe for expanding it to cause the brake lining to engage the drum. A pump operated by power from the engine of the vehicle circulates liquid through the shoes of the several brakes continuously while the engine is running, and this prevents an accumulation of heat in the shoes which would be injurious to the brake linings. A pipe system connects the shoes and the expanding members with the pressure and intake sides of the pump, and in the return pipe to the pump is arranged a throttle valve controlled by fluid pressure in the master cylinder, imposed by the pedal-operated master piston, for restricting the return flow of the circulating fluid to the pump, thereby building up a pressure in the expansible members to any predetermined ratio to the pressure in the master cylinder and forcing the shoes into engagement with the brake drum. Provision is made for operating the shoes by direct pedal pressure on the master piston in case the engine is stopped, and provision is also made for setting and releasing the brakes by mechanical means in case the fluid-operated means fails or when the car is parked.

In the accompanying drawing:

Fig. 1 is a side elevation, partly in section, of an automobile wheel brake mounted upon the backing plate, the brake drum and parts of the brake being shown in section on the line 1—1 of Fig. 2;

Fig. 1ª is a side view of the stop for the brake shoe;

Fig. 1ᵇ is a perspective view of one end of the brake shoe;

Fig. 2 is a section on the line 2—2 of Fig. 1;

Fig. 3 is an enlarged section on the line 3—3 of Fig. 1;

Fig. 4 is a similar view taken on the line 4—4 of Fig. 1;

Fig. 5 is a perspective view, on an enlarged scale, of an end portion of the brake shoe, partly broken away, the shoe and its supporting parts being shown in transverse section;

Fig. 6 is a section on the line 6—6 of Fig. 1;

Fig. 7 is a central vertical section through the master cylinder and throttle valve;

Fig. 8 is a side view, partly broken away, of one of the expansible tubes;

Fig. 9 is a plan view of the tube; partly broken away;

Fig. 10 is a diagram showing the pipe connections for passing the fluid from the pump operated by the engine through all of the brake shoes of a vehicle, in series, with return through the master cylinder to the pump;

Fig. 11 is a similar view showing the pipe connections forming a divided circuit for the fluid from the pump to the front and rear wheel brakes, thence returning through the master cylinder to the pump; and, Fig. 12 is a side elevation of the levers for operating the brake shoes by manual means independently of the fluid operating means.

Referring to Figs. 1 and 2 of the drawings, $a$ represents the brake drum which rotates with an automobile wheel and $b$ represents the stationary backing plate which carries the brake elements. A stop-piece $c$, for limiting endwise movement of the brake shoe, is secured to the upper part of the backing plate. The stop-piece, as shown, is a one-piece fitting comprising an oblong base 1 arranged radially on the backing plate and secured thereto by bolts 2, and having at its upper end a flange 3 at a right angle to the base and projecting into the drum $a$ near the peripheral wall of the latter, and at its lower end a flange 4 which projects into the drum parallel with the flange 3 but at a lesser radial distance from the axis of the drum. Projecting upwardly from the ends of the flange 4 are two integral spring arms 5 and 6, the free ends of which are at opposite sides of the flange 3. The flange 3 is a fixed stop member, while the arms 5 and 6 are yielding stop members projecting from the fixed part 4 which is nearer to the axis of the drum than the part 3. The free ends of the arms 5 and 6 normally bear against the ends of the brake shoe, which has a limited endwise movement, and the endwise thrust of the shoe is applied to one or the other of the arms at a radial distance from the axis of the drum which shortens with increased end thrust and lengthens with decreased end thrust of the shoe, as hereinafter explained.

A brake shoe supporting member $e$ consisting of a curved metal band having outwardly turned side flanges 7, is supported at its ends concentrically with the axis of the backing plate and brake drum by two cam shafts $d$ and $d'$ which extend horizontally through the backing plate at opposite sides of the stop $c$ and equidistant therefrom. Each shaft, as shown in Fig. 3, is journaled in a sleeve 8 extending through and secured to the backing plate. These cam shafts are connected, as hereinafter described, to an emergency brake lever which is operated to set the brakes by manual power if the fluid operated means fails, or when the vehicle is parked with the engine stopped. During normal running these cam shafts serve merely as supports for the brake supporting band $e$ and are held immovable through their connections to the emergency brake lever. Each cam, as shown in Figs. 1 and 3, comprises a cylindrical hub 9 and parallel cam lugs $9^a$, $9^b$ which project upwardly from the hub, and on the inner side of the band at each end and midway between its sides is a fin 10 which fits loosely between the lugs and has a straight lower edge which rests upon the cylindrical hub. By this construction lateral movement of the upper ends of the band is prevented and the band is supported. The band is further held against lateral movement by an arm 11 (Figs. 1 and 6) which projects laterally from the central portion of the band to the backing plate $b$ and has a downwardly turned end $11^a$ in which is a vertical slot $11^b$ through which a stud 12, riveted to the backing plate, extends. The stud is provided with a head $12^a$ and the part $11^a$ of the arm 11 is movable radially between the head of the stud and the backing plate to provide for expansion of the band, but the arm and supporting band cannot move laterally. The band $e$ has lugs 13 adjacent the fins 10 and these lugs have substantially vertical faces $13^a$ which abut against the cam hubs, whereby the band is held against circumferential movement. When the cam shafts are moved simultaneously in opposite directions by the emergency lever, to set the brake manually, as hereinafter explained, the lugs on the cams bear against the faces of the lugs 13 on the band and expand the latter.

Two trough-like metal housings $f$ and $f'$ are arranged on the outer side of the supporting band at opposite sides of a vertical line passing through the axis of the backing plate and drum. Each housing is angular in cross-section, having parallel sides 14 with laterally projecting flanges $14^a$ and a base 15 which fits within the side flanges of the supporting band, and each has end walls 16 of less height than the side walls. These housings project beyond the ends of the supporting band, nearly to the ends of the shoe.

Within each housing is arranged a tube $g$ made of synthetic rubber which is not deleteriously affected by contact with oil. One of these tubes is shown on a small scale in Figs. 8 and 9 in side and plan view, respectively, partly broken away, and in other figures of the drawings the tubes are shown in section. The tubes are rectangular in cross-section, with relatively thick walls and are closed at their ends. In Fig. 1 a tube $g$ is shown within the housing $f$ and a tube $g'$ is shown within the housing $f'$. Each tube fits snugly within the walls of the housing so that it can expand only in a radially outward direction. Each tube has an integral nipple 17 near each end, projecting from its outer wall, the opening in the nipple communicating with the interior of the tube.

The brake shoe consists of a seamless metal tube $h$, angular in cross-section, and closed at its ends. It extends entirely around the interior of the drum from one spring arm of the stop-piece $c$ to the other spring arm. The inner wall of the shoe has its central portion $18^a$ offset throughout the length of the tube and adapted to fit easily within the side walls of the metal housings $f$ and $f'$ close to the flat expansible tubes $g$ and $g'$. The flanges $14^a$ of the housings support the inner wall of the shoe at the sides of the offset portion, as shown, while the tubes $g$ and $g'$ are deflated. When the tubes are inflated they bear against the wide offset portion of the shoe wall throughout the lengths of the tubes and force the shoe radially outward, as hereinafter explained. Because of the large extent of the engaging surfaces of the tubes and the shoe, the latter can be moved with relatively low fluid pressure in the tubes.

The outer wall 18 of the shoe is flat in cross-section and to it is applied a removable metal brake band $i$ having inwardly turned lugs 19 at its central portion (Figs. 1 and 6), for holding the band against lateral movement on the shoe, and having similar lugs 20 at its ends (Figs. 1, $1^a$, 4 and 5), these latter lugs fitting against the sides of the shoe and in advance of lugs 21 on plates 22 which are attached to the shoe (Figs. 1, $1^a$, 3, 4 and 5), thus preventing endwise and lateral movement of the band upon the shoe but permitting the band to be readily removed when the wheel and brake drum are removed from the automobile. The band carries the brake lining 23 which is suitably secured to it.

The shoe has openings in its inner wall to receive the nipples 17 of both of the expansible tubes $g$ and $g'$. The shoe wall is flanged inwardly around the openings, as shown at 24, and the nipples of the expansible tubes fit closely within these openings. Thus, both expansible tubes are, through the nipples at their ends, in communication with the interior of the tubular brake shoe, so that fluid can flow from the shoe into and out of both tubes. Fittings $j$ attached to the tubular shoe at its ends form heads which abut against the yielding members 5 and 6 of the stop-piece. Each fitting comprises parallel triangular side pieces 22 welded to the inner wall of the tubular shoe at its edges, and a cross-piece $22^a$ joining the side pieces and adapted to abut against one of the spring arms of the stop-piece. To prevent endwise movement of the channelled housing $f'$ relatively to the tubular shoe, pins 25 welded to the inner wall of the shoe are extended into notches 26 in the side flanges of the housing f', as shown in Fig. 3, and similar connections, not shown, are made between the shoe and the housing f.

For admitting fluid to the shoe and the expansible tubes, tubular fittings 27—27ª are extended through and secured in the inner wall of the shoe at its ends, the upper ends of the tubes being close to the outer wall of the shoe. Flexible pipes 28, 28ª connect these tubes to nipples 29, 29ª respectively, which pass through and are secured to the backing plate, one of these nipples being shown in Fig. 2. If fluid is forced through one nipple into one end of the shoe, it will pass through the shoe and out at the other nipple, also filling the expansible tubes g, g' and if the out-flow of fluid is restricted, the tubes g, g' will be expanded, thereby forcing the shoe outward against the brake drum; but if the out-flow of fluid be not restricted, the fluid will flow through the shoe continuously, cooling the shoe and the brake linings without expanding the tubes or causing the brake to be applied to the drum, as hereinafter more particularly set forth.

For setting the brake by hand lever, as when the car is parked and the engine is stopped, or in case of any derangement of the fluid operated system, the cam shafts d and d' are connected to the emergency brake lever such as is commonly provided in automobiles, and by operating this lever the brakes may be applied or released. As shown in Figs. 1 and 12, crank arms 30 and 31 are secured to the ends of the shafts d and d', respectively, these arms extending radially from the shafts in the same direction. Links 32 connect these arms with opposite ends of a floating lever 33. This lever has an arm 34 which projects from its central portion, and a cable 35 connects the latter arm with the emergency brake lever, not shown. A spring 36 normally holds the floating lever and the cranks 30, 31 in the position shown in Fig. 12, in which position the lugs on the cams 9 rest against the vertical faces of the lugs 13 on the brake supporting band e, as shown in Figs. 1 and 3. By swinging the lever arm 34 to the right in Fig. 12, the two cam shafts will be simultaneously turned, and to the same extent, and the cams on the shafts will bear with equal pressure upon the vertical faces of the cams 13 (Fig. 1) and cause the radial expansion of the brake supporting member e, the channelled member, the brake shoe and the brake band, thus forcing the brake lining on the latter band into contact with the drum. By moving the emergency brake lever to permit the spring 36 to move the arm 34 in the opposite direction, the cams will be returned to the position shown in Fig. 1 and the brakes will be released. Of course, all of the brakes on the vehicle will be suitably connected to the emergency brake lever, as is customary.

The diagram, Fig. 10, represents in outline the engine k, and wheels 37, 38, 39 and 40 of an automobile; m indicates a gear pump operated by the engine, and n represents a master cylinder for controlling the flow of liquid through a pipe system which extends from the pump to the brakes o of the several wheels in series, thence returning through the master cylinder to the pump, the direction of flow being indicated by the arrows. Thus a pipe 41 extends from the pressure side of the pump to the brake of wheel 37 and the fluid, after passing through the shoe of this brake, passes through pipe 42 to the brake shoe of wheel 38, thence through pipe 43 to the brake shoe of wheel 39, thence through pipe 44 to the brake shoe of wheel 40, thence through pipe 45 to the master cylinder n and thence through pipe 46 to the intake side of the pump.

The master cylinder n is illustrated in detail in Fig. 7. Its function, in applying the brakes while the motor is in operation, is to restrict the return flow of the fluid to the pump and thereby build up a pressure in the system which will cause the expansible tubes g, g' to expand and thereby force the brake shoes and brake bands radially outward, causing the brake linings to engage the brake drum. The master cylinder comprises the reservoir 47ª and the cylinder proper 47 which depends from it, the latter being open at its upper end and in free communication with the reservoir. The cylinder 47 contains a plunger 48 and a spring 49 which presses the plunger upwardly against an annular stop 50. The plunger has a central circular opening or port 51, flaring toward its upper end, as shown, and forming a valve seat for the tapering end 52ª of a vertically movable rod 52 which extends through a central guide opening in the top 53 of the reservoir. The upper end of this rod is connected by a link 54 to a pedal lever 55. In the top of the reservoir is an air vent 56. In the bottom of the cylinder 47 is secured a circular flexible diaphragm 57, preferably of synthetic rubber, this diaphragm having a central perforation. The margin of the diaphragm is clamped between the bottom wall of the cylinder and a washer 58 upon which the spring 49 bears. A cylindrical throttle valve casing 47ᵇ depends from the bottom of the cylinder 47, as shown. The throttle valve casing is formed with an interior tapering valve seat 59 in its lower portion. The pipe 46 which leads to the intake side of the pump enters the throttle valve casing above this valve seat and the pipe 45 which returns the fluid from the brake shoes enters the throttle valve casing below said valve seat. The throttle valve p has a tubular stem 60 with a circular disk 61 near its upper end which is slidable in the casing and which fits against the lower side of the flexible diaphragm and the upper end of the stem extends through the opening in the diaphragm. The lower end of the bore in the valve stem is normally closed by a check valve 63, the stem of which is guided in a socket 64 in the bottom of the casing, and a spring 65 presses the check valve upwardly to its seat. The area of the lower end of the valve p has a predetermined ratio to the area of the disk 61 on the upper part of the stem of the throttle valve, to fix the ratio of power derived from the pump.

Several small ports 62 in the upper part of the wall of the throttle valve casing, below the disk 61, connect the interior of said casing with the interior of a casing 47ᶜ which surrounds the cylinder 47 and is spaced from it. This latter casing, at its lower end, fits fluid-tight against the wall of the throttle valve casing, below the ports 62, and the upper end of the casing 47ᶜ fits fluid-tight against the bottom of the reservoir 47ª. Ports 47ᵈ in the bottom of the reservoir establish communication between the reservoir and the casing 47ᶜ.

The system is filled with any liquid suitable for operating hydraulic brakes, this liquid filling the tubular brake shoes, the resilient tubes or diaphragms connected with the shoes, the pipe connections and throttle valve casing and also filling the master cylinder, the casing surrounding the latter and partly filling the reservoir.

When the engine of the automobile is in operation, either idling or under load, and the plunger in the master cylinder is not being used to apply the brakes, the liquid will be circulated by the gear pump through the brake shoes and back to the pump through the throttle valve casing, the throttle valve being held in wide open position by the pressure of the circulating fluid, and, partly, by the check valve spring 65, as shown in Fig. 7. Any air that happens to be entrained in the liquid, upon reaching the throttle valve casing, will float upward through the liquid and pass into the enclosing casing 47c through the perforations 62, thence through perforations 47d into the reservoir 47a, and thence to the atmosphere through vent 56. As the liquid is always in circulation and open to the atmosphere, through the passageways described, while the engine is running, air cannot accumulate in the system, and, also, the continuous circulation of the fluid prevents the accumulation of heat in the brake shoes and their linings.

To operate the brake by fluid pressure generated by the pump, the brake pedal 55 is depressed. In its initial movement, the pedal causes the rod 52 to close the port 51 in the piston 48, and further movement of the pedal causes the piston to force the liquid below it against the flexible diaphragm 57 which, bearing against the disk 61, presses the throttle valve toward its seat 59, restricting the passageway between the valve and its seat and thus building up pressure in the pipe 45, Fig. 10, which is connected to the pressure side of the pump through the brake shoes. This pressure causes radial expansion of the expansible tubes g, g' in each brake and the tubes force the brake shoes outwardly carrying their linings into engagement with the brake drums. As more liquid than the normal flow is required in the pipe system to cause expansion of the expansible tubes, this will be drawn by the pump through pipe 46 from the supply in the reservoir and casing 47c. When the pedal pressure on the piston in the master cylinder is released, the downward pressure on the throttle valve will be relieved, enlarging the opening between the latter valve and its seat, thus relieving back pressure in the pipe system, and the expansible tubes in the brakes will contract and the amount of liquid withdrawn from the reservoir of the master cylinder during the inflation of the tubes will be returned to the reservoir through the return pipe 45, throttle valve chamber and the casing 47c. While the force applied to the brakes is generated by the engine it is controlled by pedal pressure applied through the liquid in the master cylinder to disk 61 on the throttle valve stem which has a much greater area than the lower face of the throttle valve p, and hence with a moderate pedal pressure applied to the disk 61, the check valve may be moved to apply a strong braking force by obstructing the return flow of fluid from the brakes through the pipe 45. A light pressure on the pedal results in a proportionately light obstruction by the throttle valve to the return flow of fluid from the brakes, and an increased pressure on the pedal causes a proportionately increased obstruction and hence inflation of the expansible tubes in the brakes. As the returning liquid is forced past the throttle valve, the upward pressure on the valve is conveyed to the operator's foot, giving the same "feel" to the operator as though the brakes were being applied directly from the pedal.

If at any time it is desired to apply the brakes by hydraulic power when the engine and pump are stopped, as when the vehicle is coasting with its power cut off, this may be done by direct pedal pressure. In such case, by the application of pressure to the pedal, since no liquid can pass through the pipe 46 leading to the pump, the pump being stopped, the liquid pressure in the cylinder will force the throttle valve to its seat and the pressure applied through the tubular stem of the valve will cause the check valve 63 to open and fluid from the cylinder will then pass through the tubular valve stem and the return pipe 45 to the brake shoes and the inflatable tubes which operate the shoes. When the pressures are balanced on both sides of the check valve the latter will close and the brakes may be held in engagement with the brake drums by continued pressure on the pedal lever applied through the liquid in the cylinder 47 to the disk 61 on the throttle valve stem, which will hold the throttle valve closed. Upon release of pressure on the brake pedal, and consequent release of pressure on the throttle valve, the latter and the check valve will move upward and the inflated tubes in the brakes will collapse and force the liquid used to expand them into the pipe system and that amount of liquid will be returned through the pipe 45 to the reservoir through the check valve casing, and casing 47c. An equivalent amount of liquid will flow into the cylinder 47 from the reservoir immediately upon the lifting of the rod 52 from the port 51 in the piston 48.

I have described the system as applied in Fig. 10 to the brakes on the four wheels of an automobile, in series. It may, of course, be applied to the brakes of two wheels only. In Fig. 11, I have shown a modification of the pipe system by which fluid may be circulated from the pump through the brakes for each pair of wheels in series, the pipe circuits for the pairs being connected in multiple to the master cylinder and pump. The operation is the same as that described in connection with Fig. 10, only the pipe system is differently arranged. Thus, in Fig. 11, a pipe 41a leads from the pressure side of the pump and the flow of fluid here divides, part passing through pipe 70 to brake of wheel 71, thence through pipe 72 to brake of wheel 73, thence through pipe 74 to return pipe 45a which leads to the master cylinder and pipe 46a which leads to the intake side of the pump, and part of the liquid from the pipe 41a passes through pipe 75 to brake of wheel 76, thence through pipe 77 to brake of wheel 78, thence returning to the master cylinder and pump through pipes 79, 45a and 46a.

What I claim is:

1. In an automobile brake system, tubular brake shoes, means responsive to fluid pressure in the shoes for expanding the shoes radially, a pump operated by the engine of the automobile, and pipe connections between the shoes and pump for circulating fluid through the shoes when the pump is in operation.

2. In an automobile brake system, tubular brake shoes, means responsive to fluid pressure in the shoes for expanding the shoes radially, a pump operated by the engine of the automobile, pipe connections between the shoes and pump for circulating fluid through the shoes when the pump is in operation, and means for restricting the return flow of fluid from the shoes to the pump to vary the pressure in the shoes at will.

3. In an automobile brake system, tubular brake shoes, means responsive to fluid pressure in the shoes for expanding the shoes radially, a pump operated by the engine of the automobile, pipe connections between the shoes and pump for circulating fluid through the shoes when the pump is in operation, a throttle valve casing connected in the pipe system between the shoes and the intake side of the pump, a throttle valve in said casing and pedal-operated means for controlling said valve to restrict or permit the free return of fluid from the shoes to the pump.

4. In a fluid-operated brake system for motor vehicles, a plurality of brakes each comprising a shoe and an inflatable member for forcing the shoe into engagement with the brake drum, and a pump operated by the motor of the vehicle, and a pipe system connecting the inflatable members to the intake and pressure sides of the pump for circulating fluid through said members.

5. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, and a throttle valve interposed in the pipe system between said members and the intake side of the pump.

6. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, a throttle valve interposed in the pipe system between said members and the intake side of the pump, and means for adjusting the valve at will to vary the pressure in the system and said members.

7. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, a throttle valve casing connected in the pipe system between said members and the intake side of the pump, a throttle valve in said casing and pedal-operated means for controlling said valve to restrict or permit the free return of fluid from said members to the pump.

8. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, a master cylinder, a throttle valve casing, a throttle valve in said casing having a tubular stem communicating at one end with said cylinder, a check valve normally closing the other end of said stem, and a pedal-operated plunger in said cylinder for forcing liquid from the cylinder through said stem into the pipe system.

9. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, a master cylinder, a throttle valve casing, a throttle valve in said casing having a tubular stem communicating at one end with said cylinder, a check valve normally closing the other end of said stem, a piston of larger area than the area of the check valve connected to said stem, and a pedal-operated plunger in said cylinder for forcing liquid from the cylinder into said stem and, at the same time, applying pressure to said piston to press the throttle valve toward its seat.

10. In a fluid-operated brake system for motor vehicles, a plurality of brakes each comprising a shoe and an inflatable member for forcing the shoe into engagement with the brake drum, a pump operated by the motor of the vehicle, a pipe system connecting the inflatable members to the intake and pressure sides of the pump for circulating fluid through said members, a reservoir, a master cylinder below the reservoir and communicating therewith, a throttle valve casing below and communicating with the master cylinder, a throttle valve in said casing having a tubular stem communicating at one end with said cylinder, a check valve normally closing the other end of said stem, a piston of larger area than the area of the check-valve connected to said stem, a pedal-operated plunger in said cylinder for forcing liquid from the cylinder into said stem and, at the same time, applying pressure to said piston to press the throttle valve toward its seat, and a conduit connecting the throttle valve casing with said reservoir.

RICHARD A. WHITTINGHAM.